United States Patent [19]

Fornuto et al.

[11] Patent Number: 4,706,708
[45] Date of Patent: Nov. 17, 1987

[54] FUEL TANK VENTING

[75] Inventors: Joseph Fornuto, Rochester; William E. Gifford, Hemlock; Daniel Nolan, Spencerport; Carl H. Sherwood, Brookport, all of N.Y.

[73] Assignee: General Motors Corporation, Detroit, Mich.

[21] Appl. No.: 877,201

[22] Filed: Jun. 23, 1986

[51] Int. Cl.$^4$ .................... B65B 31/00; F16K 24/00
[52] U.S. Cl. .................... 137/588; 137/589; 141/52; 141/59; 141/302
[58] Field of Search .................... 141/52, 59, 302; 251/89.5; 137/587, 588, 589

[56] References Cited

U.S. PATENT DOCUMENTS 3,662,794 5/1972 Turner .................... 137/587
4,630,749 12/1986 Armstrong et al. .................... 141/59

*Primary Examiner*—A. Michael Chambers
*Attorney, Agent, or Firm*—C. K. Veenstra

[57] ABSTRACT

A fuel tank filler neck has a plate that pivots between a position restricting the filler neck and a position permitting introduction of fuel through the filler neck. A vent housing secured on the filler neck has a vapor inlet fitting and a vapor outlet fitting connected through a vent orifice, a pressure relief orifice, and a vacuum relief orifice. A diaphragm vent valve controls flow through the vent orifice. An actuating arm pivoted with the restrictor plate engages the vent valve across the vent orifice when the restrictor plate restricts the filler neck, and permits the vent valve to allow vapor flow from the vapor inlet fitting through the vent orifice to the vapor outlet fitting when the restrictor plate permits introduction of fuel through the filler neck. A diaphragm valve controls flow through the pressure relief orifice, and an umbrella valve controls flow through the vacuum relief orifice.

1 Claim, 4 Drawing Figures

FUEL TANK VENTING

TECHNICAL FIELD

This invention relates to control of vapor released during filling of a fuel tank.

SUMMARY OF THE INVENTION

When filling an automotive fuel tank, the fuel vapor in the space above the rising liquid level is displaced out of the tank. To avoid releasing the fuel vapor to the atmosphere, earlier proposals have vented the vapor to a vapor storage canister.

This invention provides a fuel tank vent actuator that opens a vent to allow unrestricted flow of fuel vapor to a vapor storage canister during filling of the tank, and that restricts the vent to inhibit flow of fuel vapor to the canister at other times.

The details as well as other features and advantages of a preferred embodiment of this invention are set forth in the remainder of the specification and are shown in the drawing.

THE PREFERRED EMBODIMENT

Figure 1:
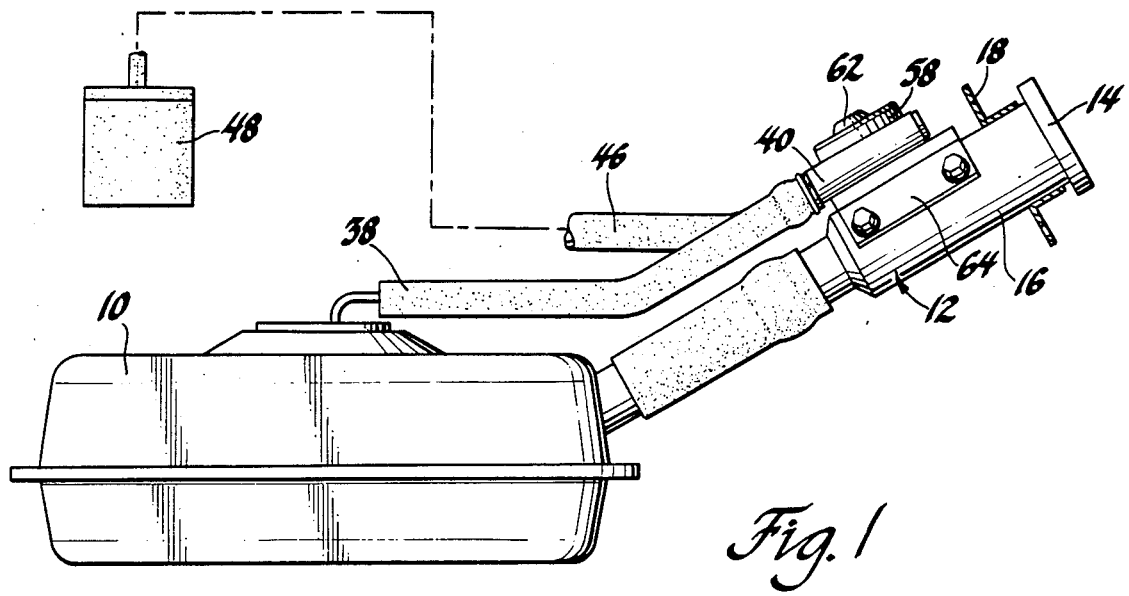
FIG. 1 is a schematic view of an automotive fuel tank venting system employing this invention.

Referring to the drawings, a fuel tank 10 has a filler neck 12 through which fuel is introduced to the tank. Filler neck 12 is normally closed by a filler cap 14.

Filler neck 12 is formed of an outer tube 16 supported by a flange 18. An insert 20 is threaded to receive filler cap 14, and has a restricted throat 22 through which the correct size filler nozzle 23 is inserted.

Figure 2:
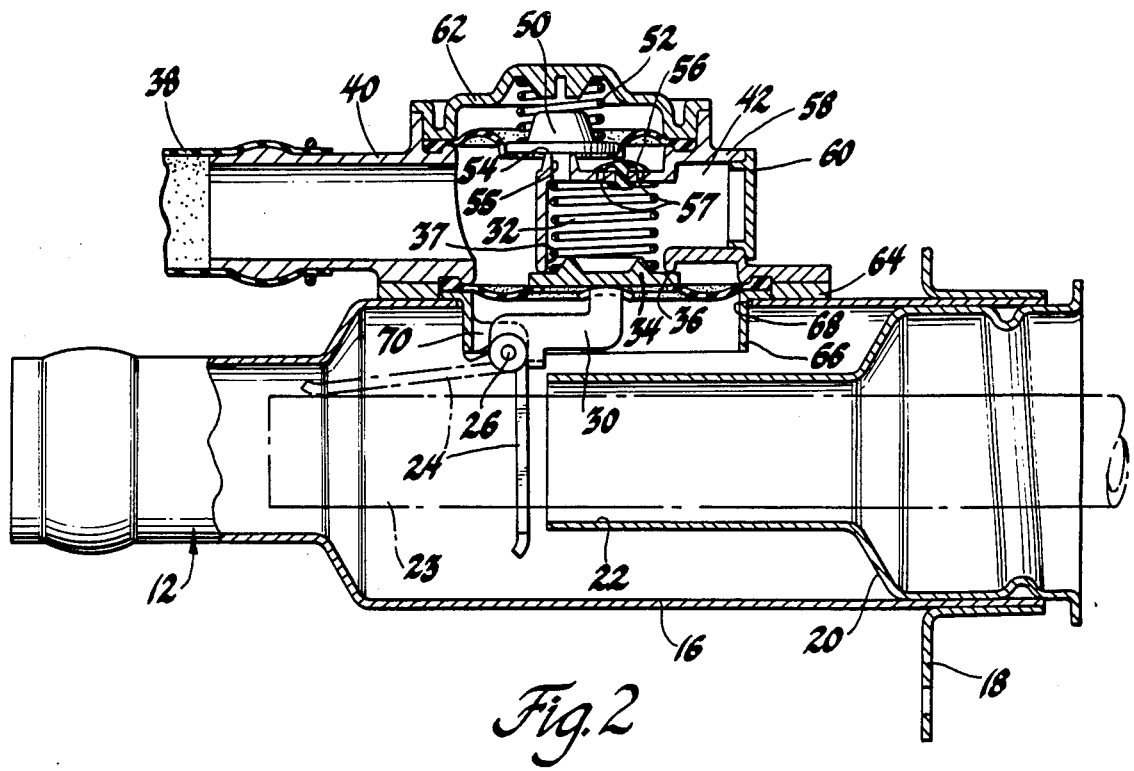
FIG. 2 is an enlarged sectional view of the filler neck and vent actuator for the FIG. 1 fuel tank.
Figure 3:
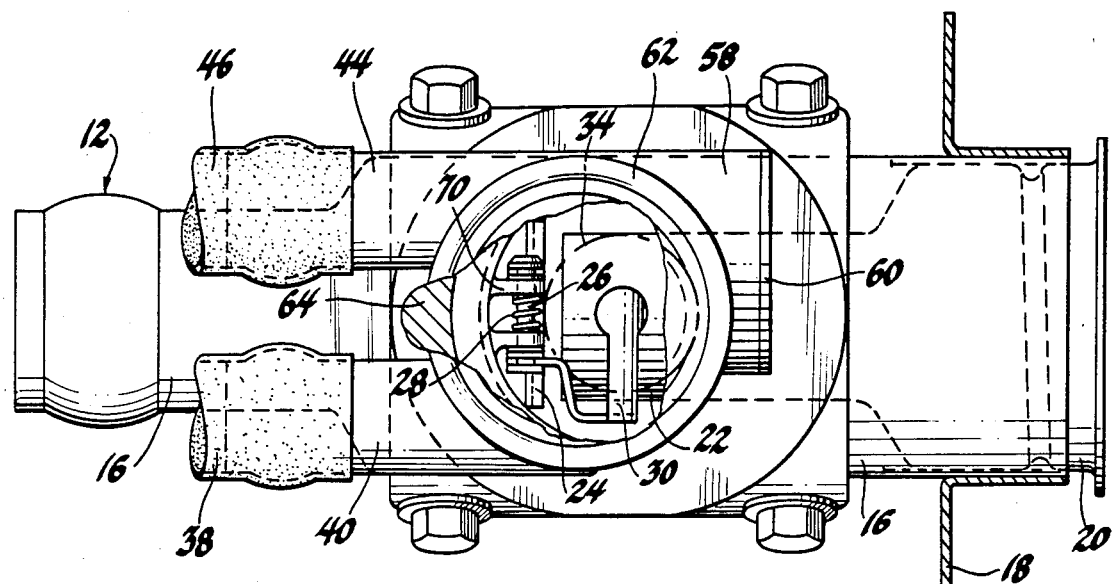
FIG. 3 is a plan view of the FIG. 1 filler neck, with portions broken away to show details of the vent actuator.
Figure 4:
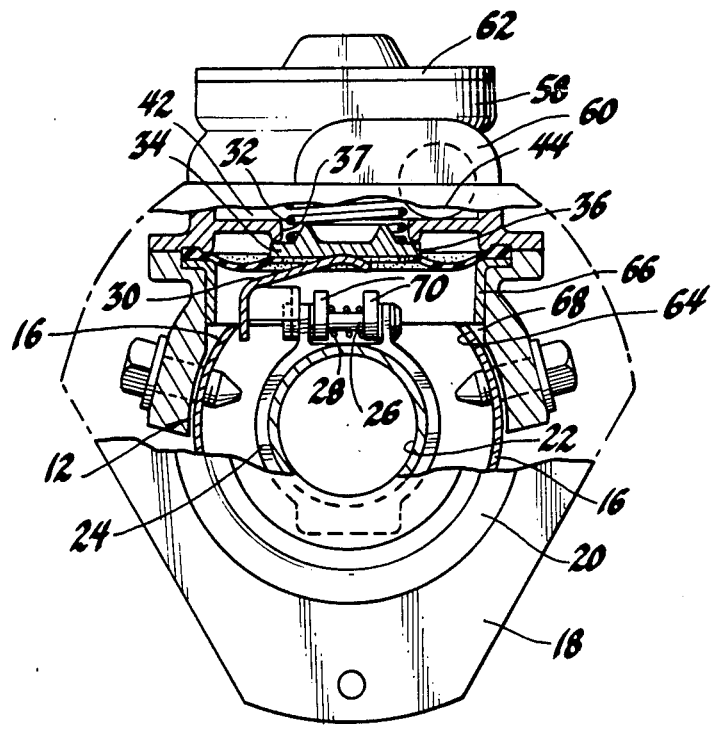
FIG. 4 is an end view of the FIG. 1 filler neck, with portions broken away to show details of the vent actuator.

A restrictor plate 24 is secured on an axle 26 within outer tube 16 at the end of throat 22 and biased to the solid-line position by a spring 28; in that position, restrictor plate 24 inhibits introduction of fuel through filler neck 12. When inserted through throat 22, nozzle 23 displaces restrictor plate 24 to the broken-line position. An actuating arm 30 also secured on axle 26 then is pivoted clockwise as shown in FIG. 2, and allows a spring 32 to disengage a diaphragm vent valve 34 from a valve seat 36 surrounding a vent orifice 37. With valve 34 disengaged from its seat 36, fuel vapor displaced from tank 10 flows upwardly through a vent line 38, a vapor inlet fitting 40 and orifice 37 into a chamber 42, and then through a vapor outlet fitting 44 and a vent line 46 to a fuel vapor storage canister 48. It will be noted that the pressure of fuel vapor in inlet fitting 40 assists in disengaaging diaphragm vent valve 34 from its seat 36.

A diaphragm valve 50 is biased by a spring 52 to engage a valve seat 54 surrounding an orifice 55 opening from fitting 40 to chamber 42. Valve 50 forms a tank pressure control valve that allows fuel vapor to flow from tank 10 through vent line 38, fitting 40, orifice 55, chamber 42, fitting 44 and vent line 46 to canister 48 whenever the pressure in tank 10 exceeds a desired upper limit, even though vent valve 34 may be held against its seat by actuating arm 30.

An umbrella vacuum releif valve 56 overlies an array of orifices 57. In the event the pressure in tank 10 drops below atmosphere pressure, umbrella valve 56 opens to allow air to flow through canister 48, vent line 46, fitting 44, chamber 42, orifices 57, fitting 40 and vent line 38 to tank 10.

A housing 58 forms chamber 42, orifices 37, 55 and 57, valve seats 36 and 54, and fitting 40 and 44. A cap 60 closes chamber 42. Diaphragm valve 50 is sandwiched between housing 58 and a cover 62. Diaphragm valve 34 is sandwiched between housing 58 and a base 64. Base 64 is contoured to conform to and seal against outer tube 16, and supports a skirt 66 that projects through an aperture 68 in outer tube 16 to support axle 26 on arms 70.

We claim:

1. A fuel tank filler neck assembly, said assembly comprising a filler neck adapted for connection to a fuel tank, a plate that pivots between a position restricting said filler neck and a position permitting introduction of fuel through said filler neck, a vent housing having a vapor inlet fitting adapted for connection to said fuel tank separately from said filler neck, said housing also having a vapor outlet fitting connected to said vapor inlet fitting through a vent orifice, a pressure control orifice, and a vacuum relief orifice, a diaphragm vent valve isolating said vent housing from said filler neck and controlling flow through said vent orifice, an actuating arm pivoted with said restrictor plate and adapted to engage said vent valve across said vent orifice when said restrictor plate restricts said filler neck, said actuating arm permitting said vent valve to allow vapor flow from said vapor inlet fitting through said vent orifice to said vapor outlet fitting when said restrictor plate permits introduction of fuel through said filler neck, a diaphragm pressure control valve controlling flow through said pressure control orifice, and a vacuum relief valve controlling flow through said vacuum relief orifice.

* * * * *